Patented Aug. 13, 1940

2,211,689

UNITED STATES PATENT OFFICE

2,211,689

HOT MELT

Harry Robert Dittmar, Wilmingtor, Del., assignor to E. I. du Pont de Nemours & Company, Wilmington, Del., a corporation of Delaware No Drawing. Application July 17, 1937,
Serial No. 154,206

1 Claim. (Cl. 260—27)

This invention relates to improved coating compositions and more particularly to the preparation and application of coating compositions containing polymeric acrylic and methacrylic acids, their homologues and derivatives.

Coating compositions today are generally applied from liquid solutions containing relatively small proportions of solids and a large proportion of solvents to give a free-flowing fluid which can be applied to the surface to be coated either by brushing, dipping, spraying, roller coating, etc. Subsequent to the coating of the material, the solid must be allowed to dry and thus free itself from the solvent. On a commercial scale, this requires expensive ovens for heating the coated material, particularly if high-boiling solvents are employed and adequate ventilation must be provided in order to remove the solvents without exposure of the workmen to explosive mixtures and health hazards. The removal of the solvents from the coated article, however, is but one of the many disadvantages inherent in the use of such coating compositions. It is apparent that the solvent is merely used as a vehicle to carry the solids from the manufacture to the point at which the coating is to be applied. Furthermore, many coats are usually required to obtain a film of practical thickness.

An object of the present invention is to provide a process for the application of coating compositions without the use of a vehicle. Another object is to provide coating compositions that may be applied as a hot fluid. Yet another object of the invention is to provide compositions containing polymeric compounds with natural and synthetic resin-fluxing agents which may be applied from a fluid state at temperatures above 100° C.

Other objects and advantages of the invention will hereinafter appear.

Resinous materials have been tried before for hot melt coating. Ordinarily, they were too viscous to be applied below their decomposition temperature. Those which were fluid enough for application, with or without modification, were invariably brittle at room temperature and lacked adhesiveness, toughness and flexibility. With the resins herein described unexpected and surprising results were obtained. Whereas they, themselves, were rubbery at 200° F. and were difficult to apply in the absence of solvent, when, however, fluxing agents were added unexpectedly fluid blends resulted, more fluid than either of the component materials. When the blends were cold the flexibility, toughness and adhesiveness of the resin component predominated.

According to the present invention it has been found that for many uses coating compositions may be prepared without the use of a solvent. These compositions are prepared in such a way that when the composition is heated to a predetermined temperature it becomes fluid and in the fluid state is applied directly to the article to be coated, either by means of rolls, doctors, sprays, dipping, or suitable devices for applying these hot compositions. It is evident that this process wholly eliminates the expense incident to the use of a vehicle in a coating composition. By controlling conditions any desired thickness of coating can be obtained in a single application.

The actual application may be accomplished in many ways,—the composition herein referred to as a hot melt is heated until fluid and by means of rotating rolls, partially submerged in the fluid, it is picked up and rolled into a surface in contact with the unsubmerged portion of the roll. It may be applied by merely flowing on the surface to be coated and drawn to the desired thickness by doctor knives, or it may be sprayed hot directly upon the surface. Other suitable methods for applying the hot melts will suggest themselves to those skilled in the art.

The compositions of the present invention can be prepared by mixing a polymeric compound with a fluxing agent, which may be accomplished in any suitable manner such as by heating the fluxing agent and then gradually adding, with stirring, the polymeric compound. The fluxing agents which I prefer to employ are the natural and synthetic resins which, when admixed with the polymeric compound, give a fluid, comparatively stable mixture at temperatures above 100° C. and preferably at about 200° C., the ratio of the polymeric compound to the fluxing agent being such that a composition results which has the desired fluidity at a selected temperature above 100° C. Plasticizers may also be added to the compositions prepared as described above to modify the plasticity at room temperature.

The polymeric compounds which may be used in my hot melt compositions include the esters of acrylic and alpha-substituted acrylic acids such, for example, as the methacrylic acid esters, e. g., methyl, ethyl, propyl, butyl, isobutyl, octyl, secondary butyl, tertiary amyl, cyclohexyl, furfuryl, and tetrahydrofurfuryl esters; the esters of acrylic acid, such as methyl acrylate, ethyl acrylate and butyl acrylate; the vinyl resins, such as, vinyl acetate, vinyl chloride, vinyl chloracetate and styrene; other derivatives of acrylic and methacrylic compounds such as their nitriles, amides, imides, as well as the acids per se and salts of the acids; and, more particularly, the polymers of unsaturated esters which, when combined with natural or synthetic resins, will give a fluid, heat stable, compatible composition at temperatures above approximately 100° C.

These hot melts may be prepared, if desired, by the interpolymerization or copolymerization of the acrylic and methacrylic acids with their esters or derivatives, by the interpolymerization and copolymerization of various esters of methacrylic acid such, for example, as the interpolymerization of the acrylic and alkacrylic acid esters of the higher alcohols with the lower molecular weight esters such as methyl and ethyl methacrylates, as well as the interpolymerization or copolymerization of such esters with other polymerizable compounds such as the vinyl esters and the vinyl halides and styrene.

Generally, I prefer to prepare hot melts by the admixture of the above designated polymeric or interpolymeric compounds with from 10 to 50% by weight of a fluxing agent such as natural gums and resins, e. g., rosin, damar, copal, kauri; synthetic resins including alkyds, coumarone-indene, chlorinated diphenyl, polymerized hydrocarbon, modified phenol-formaldehyde, and ester gum. Plasticizers such as dialkyl phthalates, triaryl phosphates, etc., are examples of those which can be used to advantage to increase room temperature plasticity.

I have found that it is advantageous to employ in my hot melt compositions medium or low molecular weight polymers or interpolymers of acrylic acid or methacrylic acid and their derivatives. In fact, high molecular weight polymers or interpolymers cannot, in most instances, be employed, since desirable fluidity at high temperatures cannot be obtained even when large amounts of fluxing agents are added to them. The medium to low molecular weight polymers or interpolymers which are well suited for my process may be prepared by polymerizing in accord with the granular polymerization process disclosed in the copending application of Crawford et al. S. N. 749,500, filed Oct. 22, 1934. They may likewise be prepared by the simple expedient of polymerizing the monomer with a larger amount of polymerization catalyst than is normally used. Generally, a polymer having the desired molecular weight characteristics can be obtained on heating the monomer, say, from 92 to 98° C. in the presence of 1% or more of peroxide as the catalyst.

My hot melt compositions can be varied to give solid to viscous liquids at room temperature in accord with the proper selection of fluxing agent, with or without plasticizer. For example, viscous liquids are illustrated by the compositions described under Examples 16, 28 and 29, and a brittle solid by Example 7.

I shall now describe a number of hot melt compositions which are well adapted for coating by various methods.

| No. | Polymeric compound | Percent | Fluxing materials | Percent | Compatibility | Fluidity at 200° C. |
|---|---|---|---|---|---|---|
| 1 | n-Butyl methacrylate | 60 | Damar gum | 40 | Slightly opaque | Good—can be easily roller coated.* |
| 2 | ...do... | 60 | 20% damar+20% dicyclohexyl phthalate. | 40 | Translucent | Excellent.** |
| 3 | Isobutyl methacrylate | 80 | Stearic acid ester—glycerol—phthalic anhydride alkyd. | 20 | Clear | Good.* |
| 4 | ...do... | 60 | Damar | 40 | Slightly cloudy | Fair.* |
| 5 | n-Butyl methacrylate | 60 | Manila copal | 40 | ...do... | Do.* |
| 6 | ...do... | 80 | Coumarone-indene resin, M. P. 95-126° C. | 20 | Clear | Excellent.** |
| 7 | Isobutyl methacrylate | 60 | Coumarone-indene resin, M. P. 127-137° C. | 40 | ...do... | Do.** |
| 8 | ...do... | 90 | Rosin | 10 | Slightly cloudy | Fair.* |
| 9 | ...do... | 66 | Hydrocarbon polymer | 33 | Clear | Good.* |
| 10 | n-Butyl methacrylate | 66 | Alkyd resin | 33 | Slightly cloudy | Excellent.** |
| 11 | ...do... | 66 | Phenolic resin | 33 | Clear | Do.** |
| 12 | ...do... | 66 | Chlorinated diphenyl resin | 33 | ...do... | Do.** |
| 13 | ...do... | 66 | Congo copal ester gum | 33 | Slightly cloudy | Good.* |
| 14 | ...do... | 66 | Modified phenol formaldehyde | 33 | Cloudy | Do.* |
| 15 | ...do... | 52.2 | Damar / Phthalic acid esters of higher alcohols. | 34.8 / 13 | Translucent | Excellent.** |
| 16 | Isobutyl methacrylate | 65 | Coumarone-indene, M. P. 5-15° C. | 35 | Clear | Do.** |
| 17 | Methyl acrylate | 50 | Damar | 50 | Translucent | Do.** |
| 18 | ...do... | 50 | Coumarone-indene, M. P. 95-126° C. | 50 | ...do... | Do.** |
| 19 | Styrene | 50 | Damar / Phthalic acid esters of the higher alcohols. | 30 / 20 | Translucent | Good.* |
| 20 | ...do... | 60 | Coumarone-indene, M. P. 5-15° C. | 40 | Slightly cloudy | Do.* |
| 21 | Vinyl acetate | 65 | Coumarone-indene, M. P. 95-126° C. | 35 | Translucent | Excellent.** |
| 22 | ...do... | 60 | Damar / Phthalic acid esters of the higher alcohols. | 33 / 7 | ...do... | Do.** |
| 23 | Methyl methacrylate | 50 | Coumarone indene, M. P. 5-15° C. | 50 | Cloudy | Fair.* |
| 24 | Ethyl methacrylate | 55 | Damar / Phthalic acid esters of the higher alcohols. | 30 / 15 | ...do... | Good.* |
| 25 | n-Propyl methacrylate | 66 | Chlorinated diphenyl resin | 34 | Clear | Do.* |
| 26 | ...do... | 60 | Ester gum | 40 | ...do... | Excellent.** |
| 27 | Isobutyl methacrylate | 50 | Ester gum / Dicyclohexyl phthalate | 30 / 20 | ...do... | Do.** |
| 28 | ...do... | 48 | Rosin / Dicyclohexyl phthalate / Titanium oxide | 29 / 19 / 4 | Opaque | Excellent.** |
| 29 | {n-Butyl 50% / Isobutyl 50%} Interpolymer | 60 | Coumarone-indene resin, M. P. 95-126° C. | 40 | Clear | Do.** |

\* Suitable for roller coating.
\*\* Suitable for roller coating, dipping, impregnating and spraying.
The addition of, say, 10-25% plasticizer such as a dialkyl phthalate or a triaryl phosphate to hot melts designated by * will render them suitable for dipping, impregnating and spraying as well as roller coating.

*Example 1.*—A hot melt composition conforming substantially to that described above under composition number 16 was heated to approximately 200° C. and an enameled copper wire drawn through the melt. The wire, as it issued from the hot melt, was spirally wound with a ribbon of regenerated cellulose in such a way that the wire was completely covered with a contiguous protective layer of the ribbon. Substantially immediately after the winding operation the wire was found to be ready for use and could at once be wound on armatures, coils or other apparatus for which such wires are usually employed without the necessity of storage to harden or cure the new coating. Paper, glass fibre, cotton and like coatings may be applied in substantially the same manner. Similar results were obtained when a base copper wire was used in place of the enameled wire of this example.

*Example 2.*—Paper food containers may be fabricated in the following manner, utilizing a hot melt similar to that disclosed above as composition number 6. The application of the hot melt to this particular use consists in coating the edge of the container blank with the hot melt heated to 200° C. and immediately thereafter, by properly applied pressure sticking, this edge to the opposite edge of the blank to form the container. Subsequent to the formation of the container by the adhesion of the various surfaces, the container may be coated with hot paraffin in order to render it impervious to aqueous solutions, and after cooling it has been found that in spite of the hot paraffin application the edges are firmly held together with no softening of the melt.

For packaging of many food stuffs, it has been found advantageous to coat the inner surface of the container as a blank or after fabrication of the container, preferably the former, with hot melt compositions in order to protect the container from the food stuffs. For this purpose hot melts are selected which have no plasticizers or other added substances which impart taste to the resulting hot melt. For this particular application hot melts such as those designated above as numbers 1, 23, and 26 are acceptable.

*Example 3.*—A resin blend similar in composition to that described under number 1 was roller coated onto a thin sheet steel plate. A sheet of wood veneer was placed on the resin-coated surface and then securely bonded to the steel by heating at 300° F. for 30 seconds in a hydraulic press. The veneered metal, after being removed from the press, was shaped into the sides of a box or cabinet by bonding over a suitable mandrel before the resin mixture had cooled to 200° F. The wood veneer was tenaciously glued to the metal and showed no indications of failure at the corners of the shaped cabinet.

*Example 4.*—Very thin sheet steel was roller coated with a hot fluid solution corresponding to composition number 1 and paper continuously glued to the hot adhesive before it had cooled. Metal so coated on both sides with paper can be used for the fabrication of containers, container closures, etc.

*Example 5.*—Molten mixture number 4 was extruded at 150° C. in drops into the center of a metal crown type bottle closure, immediately after which a pressed cork liner was stamped into the cap. The hot adhesive cooled almost instantly, tenaciously adhering the cork liner to the metal cap. The same composition may be used for gluing a paper or metal "spot" to the cork cap liner.

Hot melts, prepared in accord with the present invention, are particularly well adapted for coating, either by roller coating or other mechanical methods, of paper, metal cloth, woven textiles, and the like. Moreover, these hot melts are particularly useful as adhesives. When applied in this manner the hot melt is roller coated, for example, on paper, metal, plywood, rubber, leather, cork, or the like and after the application of the hot melt the substance to be stuck to the coated surface may be placed thereon and by the application of heat, sufficient to soften the coating, the adhesion is made or alternatively the adhesion can be made before the applied hot melt has cooled. These hot melt blends are likewise useful for the coating of paper, protection of metal, stiffening of paper and impregnation of felt, asbestos, wood and cork. They may be applied to wire as an enamel and particularly when the hot melts, consisting of a high percentage of methacrylic acid esters are employed, an enamel having high dielectric strength is obtained. In this same field the hot melts are particularly applicable for the dipping of electrical equipment such as armatures, motors and the like in order to render them moisture proof and increase their dielectric strength.

Where the hot melts are to be used for surface coating of paper, cardboard, linoleum, and the like, where impervious resistance and a surface which is hard, dry and mar resistant is desired, it has been found that fluxing agents which give compositions that are non-tacky under ordinary conditions and temperatures up to 49° C. and which are fluid at approximately 200° C. are preferred. Fluxing agents of this nature include coumarone-indene, the alkyd resins, phenolic resins, ester gum, and the like. Typical hot melt compositions of this nature are illustrated by those listed above as numbers 7, 8, and 23. For surface coatings to be used in place of spirit varnishes and lacquers, particularly for coating paper, woven textiles and surfaces of similar texture, fluxing agents of this class are preferred, and it is generally desirable that when used plasticizers be added in order to obtain the desired degree of plasticity, among the plasticizers which have proven acceptable for this use castor oil, dicyclohexylphthalate, and dibutyl phthalate are recommended.

In addition to the above characteristics, the hot melt compositions containing the esters of methacrylic acid have the unexpected and highly useful characteristic of being colorless, odorless, tasteless, and non-toxic and, in addition, methyl, ethyl, and propyl polymeric methacrylates are insoluble in paraffin. Accordingly, they are exceptionally well adapted for use in cardboard food and oil containers.

From consideration of the above specification it will be appreciated that many changes may be made in the composition of the hot melts used without departing from the scope of the invention or sacrificing any of its advantages.

I claim:

A solvent-free hot melt coating composition fluid at temperatures above approximately 100° C. and consisting of 60 parts of polymeric n-butyl methacrylate of a molecular weight obtained on heating the monomer from 92° to 98° C., in the presence of at least 1% benzoyl peroxide and 40 parts of damar gum, said coating composition being appliable in a fluid state at a temperature between 100° and 300° C.

HARRY ROBERT DITTMAR.